(12) United States Patent
Lin et al.

(10) Patent No.: US 10,863,774 B2
(45) Date of Patent: Dec. 15, 2020

(54) BATTERY STICK OF ELECTRONIC CIGARETTE

(71) Applicant: Guangrong Lin, Guangdong (CN)

(72) Inventors: Guangrong Lin, Guangdong (CN); Xianbin Zheng, Guangdong (CN)

(73) Assignee: Guangrong Lin, Shenzhen (CN)

( * ) Notice: Subject to any disclaimer, the term of this patent is extended or adjusted under 35 U.S.C. 154(b) by 302 days.

(21) Appl. No.: 16/067,135

(22) PCT Filed: Aug. 30, 2016

(86) PCT No.: PCT/CN2016/097436
§ 371 (c)(1),
(2) Date: Jun. 29, 2018

(87) PCT Pub. No.: WO2017/113845
PCT Pub. Date: Jul. 6, 2017

(65) Prior Publication Data
US 2019/0000146 A1  Jan. 3, 2019

(30) Foreign Application Priority Data
Dec. 31, 2015 (CN) .......................... 2015 1 1028238

(51) Int. Cl.
*A24F 47/00* (2020.01)
*H01M 2/10* (2006.01)

(52) U.S. Cl.
CPC ............ *A24F 47/008* (2013.01); *A24F 47/00* (2013.01); *H01M 2/1055* (2013.01); *H01M 2220/30* (2013.01)

(58) Field of Classification Search
CPC .. A24F 47/00; A24F 47/008; H01M 2220/30; H01M 2/1055
See application file for complete search history.

(56) References Cited

U.S. PATENT DOCUMENTS

| | | | |
|---|---|---|---|
| 2014/0209110 A1* | 7/2014 | Hon | H01M 10/425 131/329 |
| 2015/0059786 A1* | 3/2015 | Li | H01M 2/105 131/329 |
| 2016/0073691 A1* | 3/2016 | Liu | A24F 47/008 131/329 |

FOREIGN PATENT DOCUMENTS

| CN | 203388267 U | 1/2014 |
|---|---|---|
| CN | 203676127 U | 7/2014 |

(Continued)

OTHER PUBLICATIONS

International Search Report of PCT Patent Application No. PCT/CN2016/097436 dated Dec. 5, 2016.

*Primary Examiner* — Miriam Stagg
*Assistant Examiner* — Lilia Nedialkova

(57) ABSTRACT

A battery stick of an electronic cigarette comprises an outer tube having a closed end and an opening end, and a connecting sleeve, wherein a battery is disposed inside the outer tube, an air inlet aperture is provided in a wall of the outer tube, an inner wall of the opening end of the outer tube is sleeved on an outer wall of the connecting sleeve, an inner wall of one end of the connecting sleeve corresponding to the opening end of the outer tube is sleeved on an outer electrode, an inner wall of the other end thereof is mounted with an air flow switch, a sealing component for the air flow switch and a circuit board, the outer electrode is arranged with connecting means, an inner electrode is arranged inside the outer electrode, and an insulation sleeve is arranged between the inner and outer electrodes.

8 Claims, 5 Drawing Sheets

(56) References Cited

FOREIGN PATENT DOCUMENTS

CN 205337611 U 6/2016
WO WO-2016037360 A1 * 3/2016 ........... H05B 1/0244

* cited by examiner

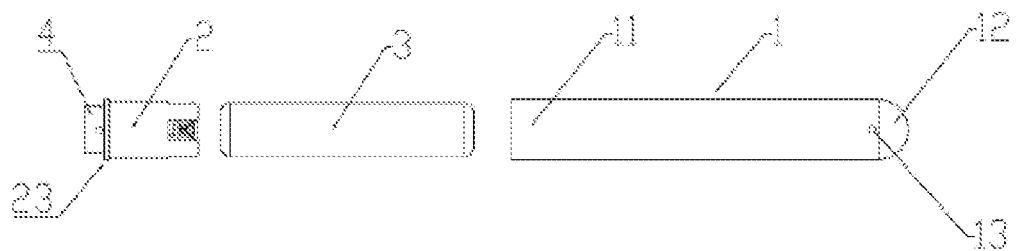
FIG. 1
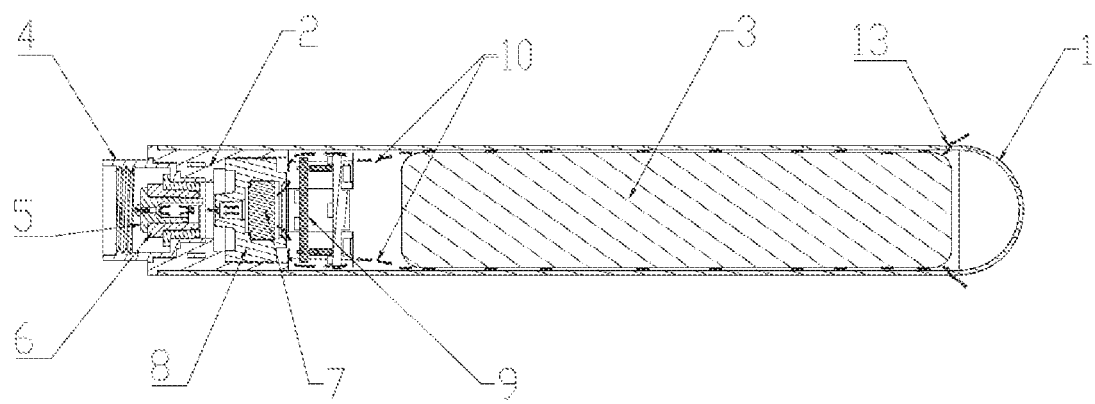
FIG. 2
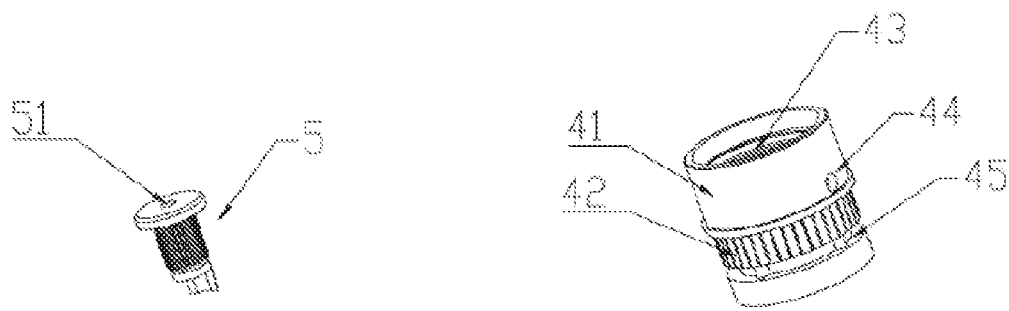
FIG. 3
FIG. 4

BATTERY STICK OF ELECTRONIC CIGARETTE

FIELD OF THE INVENTION

The present invention relates to the field of electronic cigarettes, more particularly to a battery stick of an electronic cigarette.

BACKGROUND OF THE INVENTION

Since the electronic cigarette liquid does not contain tobacco tar which is harmful to the human body, the electronic cigarettes are favored by many people. Existing liquid-refillable electronic cigarettes available in the market usually comprise a battery stick, a vaporization stick and a mouthpiece. Herein, the vaporization stick usually comprises a vaporizer, the vaporizer comprises a liquid reservoir and a vaporization unit, and the vaporization unit comprises a liquid guiding wick and a heating coil. Herein, the battery stick usually comprises a circuit board, namely a circuit control board, an air flow switch, namely an air flow sensor, a battery, etc. The battery supplies electric power to the heating coil of the vaporizer. The electronic cigarette liquid in the liquid guiding wick can be heated by energized heating coil, and vaporized to produce vapor.

The battery stick of existing electronic cigarettes usually has a lamp cap end and a connecting end, and the circuit board is usually arranged at the end of the battery stick which is arranged with the lamp cap. Electric wires for electrical connection are respectively introduced from the battery to the circuit board, and introduced back from the circuit board to an electrode of the connecting end through the battery. In such case, many long electric wires are used, which results in complicated wiring. Consequently, failures such as short-circuit and circuit break caused by heating or poor welding may occur, and the production efficiency is reduced due to inconvenient assembly. The lamp cap of existing electronic cigarettes usually is mounted at the front end of the battery stick, and thus the light emitting state of the lamp cap cannot be readily observed by the users during smoking. Furthermore, the battery sticks of existing electronic cigarettes do not have the function of preventing the vapor from flowing back to the interior of the battery stick from the vaporization stick. In such case, moisture in the vapor may be accumulated at the air flow switch, the circuit board or the battery, which will lead to corrosion damages and result in failures of electronic cigarettes.

SUMMARY OF THE INVENTION

Technical Problems

In order to solve the above described existing problems, the present invention aims to provide a battery stick of an electronic cigarette, in which the circuit board is arranged between the battery of battery stick and the electrodes to realize a reduction in length of the electric wires, in which the lamp cap arranged on the battery stick is omitted, and in which sealing component for air flow switch is provided for preventing flowing back of the vapor.

Technical Solutions

The present invention provides a technical solution as follows. A battery stick of an electronic cigarette comprises an outer tube having a closed end and an opening end, and a connecting sleeve, wherein a battery is disposed inside the outer tube, an air inlet aperture is provided in a wall of the outer tube, an inner wall of the opening end of the outer tube is sleeved on an outer wall of the connecting sleeve, an inner wall of one end of the connecting sleeve corresponding to the opening end of the outer tube is sleeved on and connected with an outer electrode, an inner wall of the other end of the connecting sleeve is sleeved on and mounted with an air flow switch, a sealing component for the air flow switch and a circuit board, wherein the outer electrode is arranged with connecting means, an inner electrode is arranged inside the outer electrode, and an insulation sleeve is arranged between the inner electrode and the outer electrode to separate them from each other.

Preferably, the sealing component for the air flow switch and the circuit board are successively mounted in the connecting sleeve, and the air flow switch is mounted inside the sealing component for the air flow switch.

Preferably, a notch which is rectangular in cross section is formed in a wall of the connecting sleeve at a position where the circuit board is mounted, a protruding and extending part is arranged at a circumferential edge of the circuit board and correspondingly engaged with the notch, and a bulge is arranged on an inner wall of one end of the connecting sleeve which is arranged with the notch, so as to retain the circuit board.

Preferably, a circumferential protruding shoulder is radially arranged on one end of the connecting sleeve which is arranged with the outer electrode, wherein an outer diameter of the shoulder equals to an outer diameter of the outer tube, or the difference therebetween is less than ±2 mm.

Preferably, the connecting sleeve is made of plastic light-guide materials, the circuit board is arranged with an LED indicator for emitting light when an electronic cigarette user smokes, and the light can be transmitted through a wall of the connecting sleeve to the shoulder and light up the shoulder.

Preferably, the outer electrode comprises a connecting end and a fixed-connecting end, wherein the connecting end is tubular shaped and exposed from the connecting sleeve, the connecting end has a smaller outer diameter than the connecting sleeve, and the connecting means is internal thread provided on an inner wall of the connecting end; wherein the fixed-connecting end is fixedly connected to an inner wall of one end of the connecting sleeve, an inner wall of the fixed-connecting end adjacent to the connecting end is aligned with that of the connecting end, and inner diameter of another part of the inner wall of the fixed-connecting end sharply decreases, the inner electrode is sheathed with an insulation sleeve and then mounted on the inner wall of the fixed-connecting end at a position where the inner diameter is decreased.

Preferably, an annular groove is formed on an outer wall of the fixed-connecting end of the outer electrode, and an inner shoulder which can be correspondingly engaged with the annular groove is formed on an inner wall of the connecting sleeve, and the fixed-connecting end of the outer electrode is engaged with the connecting sleeve by in-mold integral molding.

Preferably, a metal sleeve is arranged between the outer electrode and the insulation sleeve.

Preferably, circumferential bulges are radially arranged on an outer wall of the sealing component for the air flow switch, the sealing component for the air flow switch is axially arranged with a wiring channel, a receiving cavity for snugly receiving the air flow switch is provided inside one end of the sealing component for the air flow switch, an inner circumferential bulge is radially arranged at an opening of the receiving cavity so as to retain the air flow switch; wherein, at the other end of the sealing component for the air flow switch, a protruding hollow circular truncated cone is formed in the center and an annular-shaped groove is formed in the periphery, and a central aperture is provided in an upper surface of the circular truncated cone, so as to communicate with a hollow part of the circular truncated cone and with the receiving cavity.

Preferably, the sealing component for the air flow switch is made of soft plastic materials, silica gel or rubber materials.

Advantages

Since the circuit board in the present invention is arranged between the battery of battery stick and the electrodes, shorter and fewer electric wires are required, failures such as circuit overheating, circuit break and short-circuit of the electronic cigarette can be minimized, the wiring and the assembly of the battery stick are facilitated, and thus the production efficiency is increased. In order to indicate a working state, the light emitted by the indicator of the circuit board escapes through the shoulder of the light-guide connecting sleeve rather than a lamp cap which is usually arranged on the battery stick. Consequently, it is convenient for the electronic cigarette users to observe working states of the electronic cigarette during smoking, and meanwhile better user experience can be provided. Due to the sealing component for the air flow switch, corrosion damages caused by the vapor which flows back to the air flow switch, the circuit board and the battery is avoided.

BRIEF DESCRIPTION OF THE DRAWINGS

FIG. 1 is an exploded view of a battery stick of an electronic cigarette according to the present invention;

FIG. 2 is a cross-sectional view of a battery stick of an electronic cigarette according to the present invention;

FIG. 3 is a perspective view of an inner electrode according to the present invention;

FIG. 4 is a perspective view of an outer electrode according to the present invention;

Figure 5:
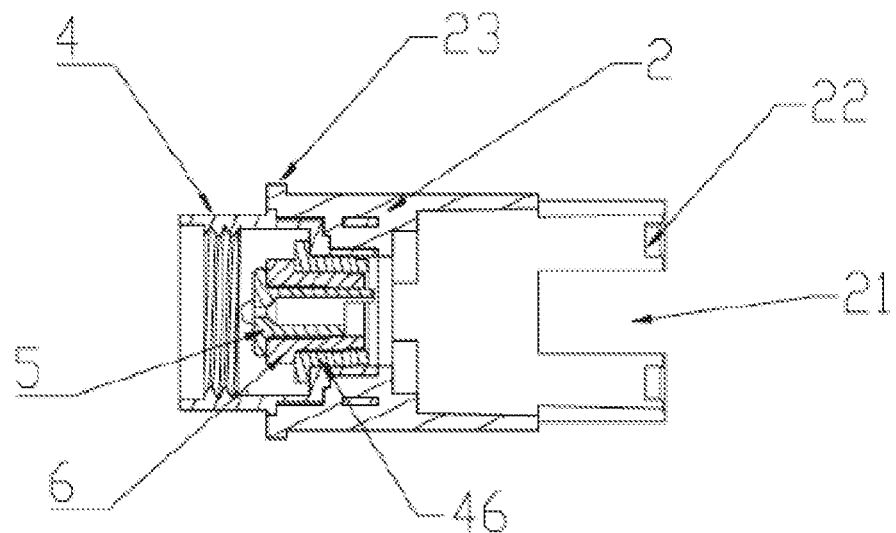
FIG. 5 is a cross-sectional view illustrating a connecting sleeve, an inner electrode, and an outer electrode according to the present invention.
Figure 6:
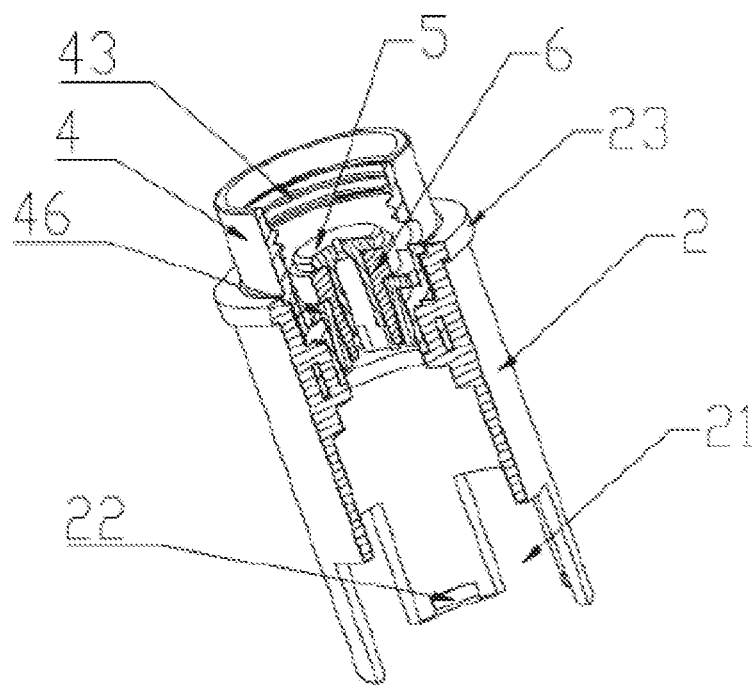
FIG. 6 is a partial sectional view illustrating a connecting sleeve, an inner electrode, and an outer electrode according to the present invention.
Figure 7:
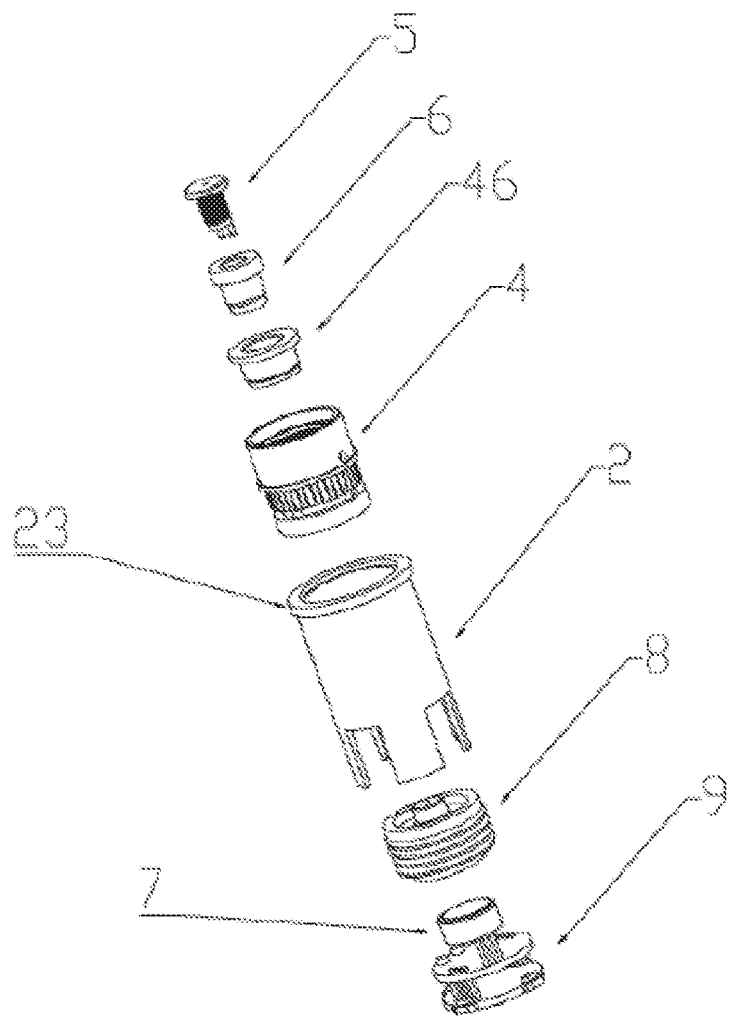
FIG. 7 is an exploded view illustrating a connecting sleeve and internal parts thereof according to the present invention.
Figure 8:
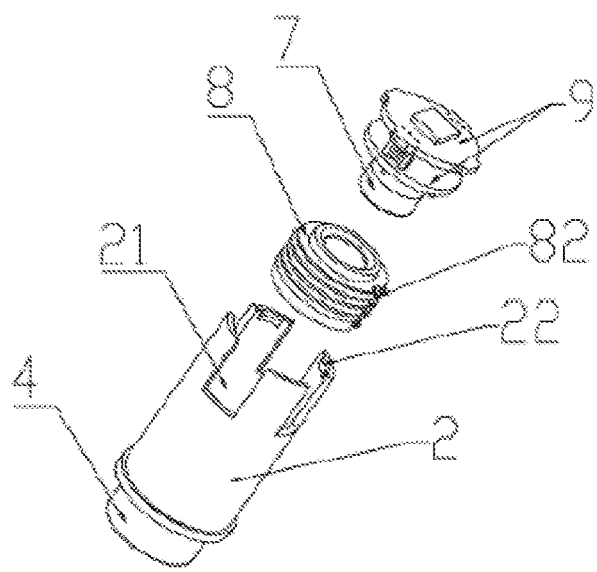
FIG. 8 is a partial exploded view illustrating a connecting sleeve and internal parts thereof according to the present invention.
Figure 9:
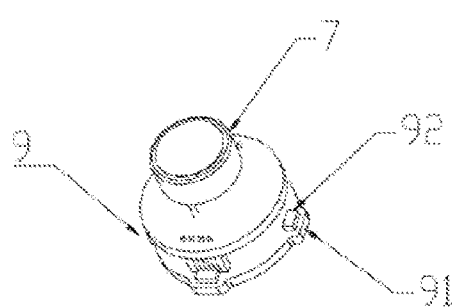
FIG. 9 is a perspective view illustrating a circuit board and an air flow switch according to the present invention.
Figure 10:
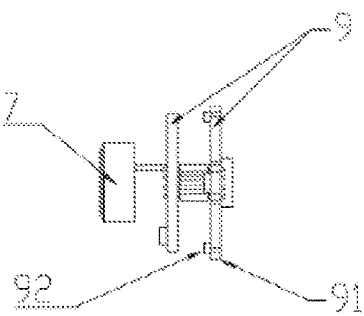
FIG. 10 is a side view illustrating a circuit board and an air flow switch according to the present invention.

In the figures, reference numerals of main parts are as follows: outer tube 1; opening end 11; closed end 12; air inlet aperture 13; connecting sleeve 2; notch 21; bulges 22; protruding shoulder 23; battery 3; outer electrode 4; connecting end 41; fixed-connecting end 42; internal threads 43; through-hole of outer electrode 44; annular groove 45; metal sleeve 46; inner electrode 5; through-hole of inner electrode 51; insulation sleeve 6; air flow switch 7; sealing component for air flow switch 8; circumferential bulges 81; wiring channel 82; receiving cavity 83; inner circumferential bulge 84; annular-shaped groove 85; circular truncated cone 86; central aperture 87; cavity 88; circuit board 9; protruding and extending part 91; LED indicator 92; air flow path 10.

DETAILED DESCRIPTION OF ILLUSTRATED EMBODIMENTS

The present invention will be explained below in detail in conjunction with the drawings.

Referring to FIGS. 1-3, a battery stick of an electronic cigarette according to an embodiment of the present invention comprises an outer tube 1, a connecting sleeve 2 and an outer electrode 4 which are connected, wherein the outer tube 1 has a closed end and an opening end, and the wall of the outer tube 1 is provided with an air inlet aperture 13 so as to allow air to flow into the interior of the outer tube 1 to enable detection of smoking action when an electronic cigarette user smokes. A battery 3 is mounted inside the outer tube 1, mounted from the opening end 11. An annular protruding shoulder 23 is arranged at a head part on one end of the connecting sleeve 2, and the outer diameter of the shoulder 23 equals to the outer diameter of the outer tube 1. The inner wall of the opening end 11 of the outer tube 1 is sleeved on the outer wall of the connecting sleeve 2, that is, the connecting sleeve 2 is sheathed in the outer tube 1 from the opening end 11 and stopped by the shoulder 23. When the connecting sleeve 2 is disposed inside the outer tube 1, the outer diameter of the shoulder 23 equals to that of the outer tube 1, such that their outer circumferential surfaces are flush with each other and thus they are integrated with each other (Alternatively, since too much difference will affect aesthetic appearance and hand feeling, the difference between the outer diameter of the shoulder 23 and the outer tube 1 may be less than ±2 mm). The inner wall of one end of the connecting sleeve 2 corresponding to the opening end 11 of the outer tube is sleeved on and connected with the outer electrode 4, the inner wall of the other end of the connecting sleeve 2 corresponding to the closed end 12 of the outer tube is sleeved on and mounted with an air flow switch 7, a sealing component 8 for the air flow switch and a circuit board 9. The outer electrode 4 is arranged with connecting means, i.e., internal threads 43, an inner electrode 5 is arranged inside the outer electrode 4, and an insulation sleeve 6 is arranged between the inner electrode 5 and the outer electrode 4. The air flow switch 7, namely an air flow sensor, is used for detecting a signal indicative of the air flow, that is, detecting a signal indicating that air is drawn in and passes through the air flow switch 7 when an electronic cigarette user smokes, so as to realize detection of smoking action of the mouth of the electronic cigarette user. The circuit board 9, namely a circuit control board, is electrically connected with the battery 3, the outer electrode 4, the inner electrode 5, and the air flow switch 7 respectively by means of electric wires (not shown in the figures). The circuit board 9 is arranged with control circuit, LED and chip, and other electronic components (not shown in the figures), and has functions of signal identification, power supply control, circuit protection, etc. The outer electrode 4 and the inner electrode 5 are respectively electrically connected with the circuit of the circuit board 9. When the battery stick of the electronic cigarette according to the present invention is connected with the vaporization stick of the electronic cigarette (not shown in the figures), the outer electrode 4 and the inner electrode 5 may be respectively connected with an outer electrode and an inner electrode of the vaporization stick, so as to supply electric power provided by the battery 3 to the vaporization unit of the vaporization stick. In the event that the battery runs out of power, the battery stick of the electronic cigarette according to the present invention can be connected with a recharger. In such case, the outer electrode 4 and the inner electrode 5 can be respectively connected with positive and negative electrodes of the recharger, so as to allow the recharger to supply electric power and recharge the battery. Herein, the outer electrode 4 may be connected with a positive electrode or a negative electrode of the battery 3, and meanwhile the inner electrode 5 may be connected with a negative electrode or a positive electrode of the battery 3.

As described above, in the battery stick of the electronic cigarette according to the embodiment of the present invention, the circuit board 9, instead of being conventionally arranged in the lamp cap at the closed end of the outer tube, is arranged between the outer and inner electrodes 4, 5 and the battery 3. With such design, shorter and fewer electric wires for the connection between the battery 3 and the circuit board 9 and between the circuit board 9 and the outer and inner electrodes 4, 5 are required, and the wiring is simplified as well. Consequently, failures such as short-circuit, circuit break and overheat caused by complicated wiring can be minimized, and the operational reliability can be improved. Furthermore, it facilitates convenient assembly in production, and thus the production efficiency is increased.

Referring to FIGS. 3-7, in the embodiment, the outer electrode 4, as an electrode, apparently is made of conductive metallic materials. The outer electrode 4, which also serves as a connecting member, is arranged with connecting means. Usually, the connecting means of the outer electrode 4 is a detachable connecting means, for example in manners of threaded connections including female threaded connection and male threaded connection, snap-fit connections, plug-in connections, magnetic connections, etc. In the embodiment, the outer electrode 4 has a connecting end 41 and a fixed-connecting end 42. The connecting end 41 is tubular shaped and is exposed from one end of the connecting sleeve 2 (corresponding to the opening end 11 of the outer tube). The connecting end 41 has a smaller outer diameter than the connecting sleeve 2, and the inner wall thereof is provided with internal threads 43 serving as connecting means for connecting with external threads (not shown in the figures) of the vaporization stick of the electronic cigarette, so as to form a whole electronic cigarette. At least one through-hole 44 of outer electrode is radially formed in the wall of the connecting end 41 and is capable of serving as an air inlet for a vaporization cavity of the vaporization stick when an electronic cigarette user smokes. The fixed-connecting end 42 is fixedly connected to the inner wall of one end of the connecting sleeve 2. The inner wall of the fixed-connecting end 42 adjacent to the connecting end 41 is aligned with that of the connecting end 41, and inner diameter of another part of the inner wall of the fixed-connecting end 42 decreases in a stepped manner. The inner electrode 5 is T-shaped and is sheathed with an insulation sleeve 6 and then mounted on the inner wall of the fixed-connecting end 42 at a position where the inner diameter is decreased. A through-hole 51 of the inner electrode is axially formed in the inner electrode 51, so as to function as a part of the air flow path.

In the embodiment, referring to FIG. 4, an annular groove 45 is formed on the outer wall of the fixed-connecting end 42 of the outer electrode 4, and an inner shoulder (not shown in the figures) which can be correspondingly engaged with the annular groove 45 is formed on the inner wall of the connecting sleeve 2. In such case, the fixed-connecting end 42 of the outer electrode is fixedly connected with the inner wall of the connecting sleeve 2. The engagement connection thereof is performed by in-mold integral molding, that is, during the injection molding of the connecting sleeve, the fixed-connecting end 42 of the outer electrode is put into the mold together to perform injection molding. Hence, a firm connection can be provided and disengagement can hardly occur.

In the embodiment, referring to FIGS. 5-8, a metal sleeve 46 is arranged between the outer electrode 4 and the insulation sleeve 6.

The electric wire connected with the circuit board 9 can be welded to the metal sleeve 46, and then connected in contact with the outer electrode 4. In such case, the integrally molded connecting sleeve is prevented from being scorched or deformed due to the high temperature generated when the electric wire is directly welded to the outer electrode. In addition, welding an electric wire to the metal sleeve 46 and then mounting the metal sleeve 46 into the outer electrode 4 allows a convenient assembly in production and improve the production efficiency.

Referring to FIGS. 7-12, in the battery stick of the electronic cigarette according to the embodiment of the present invention, the sealing component 8 for the air flow switch and the circuit board 9 are successively mounted on the inner wall of the connecting sleeve 2, and the air flow switch 7 is mounted inside the sealing component 8 for the air flow switch. Instead of a manual run switch arranged on the outer wall of the battery stick and used for switching on the power for the vaporization unit, the air flow switch 7 is arranged in the battery stick of the electronic cigarette according to the present invention. When an electronic cigarette user smokes, negative pressure is generated in the mouthpiece of the electronic cigarette due to the suction, and thus the air inside the battery stick flows. In such case, the air flow can be detected by means of the air flow switch 7, and a signal indicative of the smoking action can be automatically sent to switch on the power for the vaporization unit. A notch 21 which is rectangular in cross section is formed in the wall of the connecting sleeve 2 at a position where the circuit board 9 is mounted. Alternatively, one or more than one notch 21 may be provided. A protruding and extending part 91 may be arranged at the circumferential edge of the circuit board 9 and correspondingly engaged with the notch 21. In such case, the number and respective position of the protruding and extending part 91 correspond to the number and respective position of the notch 21, and the width of the protruding and extending part 91 equals to that of the notch 21, such that the protruding and extending part 91 can be stuck in the notch 21. Consequently, a rotation of the circuit board 9 along the circumferential direction of the connecting sleeve 2 is avoided, and convenient assembly of the circuit board 9 to the connecting sleeve 2 is facilitated. Bulges 22 are arranged on the inner wall of the end of the connecting sleeve 2 which is arranged with the notch 21, so as to retain the circuit board 9 and prevent the circuit board 9 from axially moving towards the outside of the connecting sleeve 2.

Referring to FIGS. 9-13, in order to improve sealing performance, the sealing component 8 for the air flow switch is made of soft plastic materials, silica gel or rubber materials. A plurality of circumferential bulges 81 are radially arranged on the outer wall of the sealing component 8 for the air flow switch, so as to improve the sealing between the sealing component 8 for the air flow switch and the inner wall of the connecting sleeve 2. The sealing component 8 for the air flow switch is axially arranged with a wiring channel 82, through which the electric wires for connecting the circuit board 9 with the inner and outer electrodes can pass. Inside the sealing component 8 for the air flow switch, a receiving cavity 83 for snugly receiving the air flow switch 7 is provided at its one end. An inner circumferential bulge 84 is radially arranged at the opening of the receiving cavity 83 so as to retain the air flow switch 7 and prevent it from getting out. At the other end of the sealing component 8 for the air flow switch, a protruding hollow circular truncated cone 86 is formed in the center and an annular-shaped groove 85 is formed in the periphery. Herein, a central aperture 87 is provided in the upper surface of the circular truncated cone 86, so as to communicate with the hollow part of the circular truncated cone 86 and the receiving cavity 83.

Figure 11:
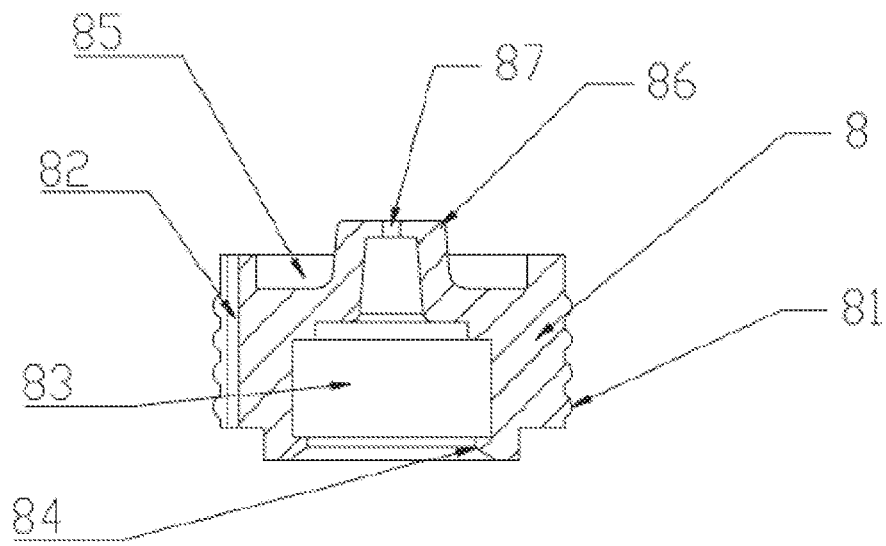
FIG. 11 is a cross-sectional view of a sealing component for an air flow switch according to the present invention.
Figure 12:
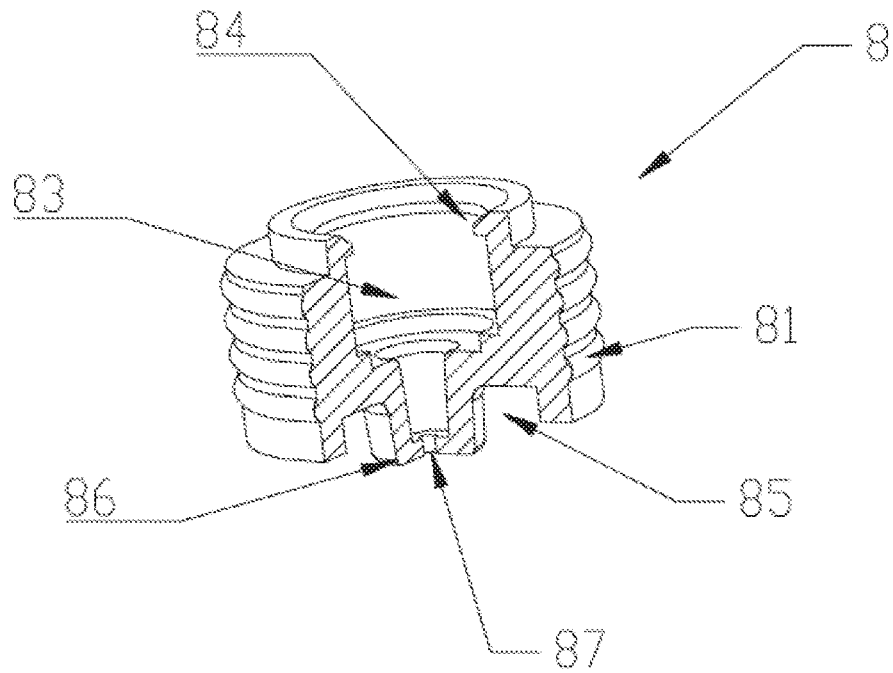
FIG. 12 is a partial sectional view of a sealing component for an air flow switch according to the present invention.
Figure 13:
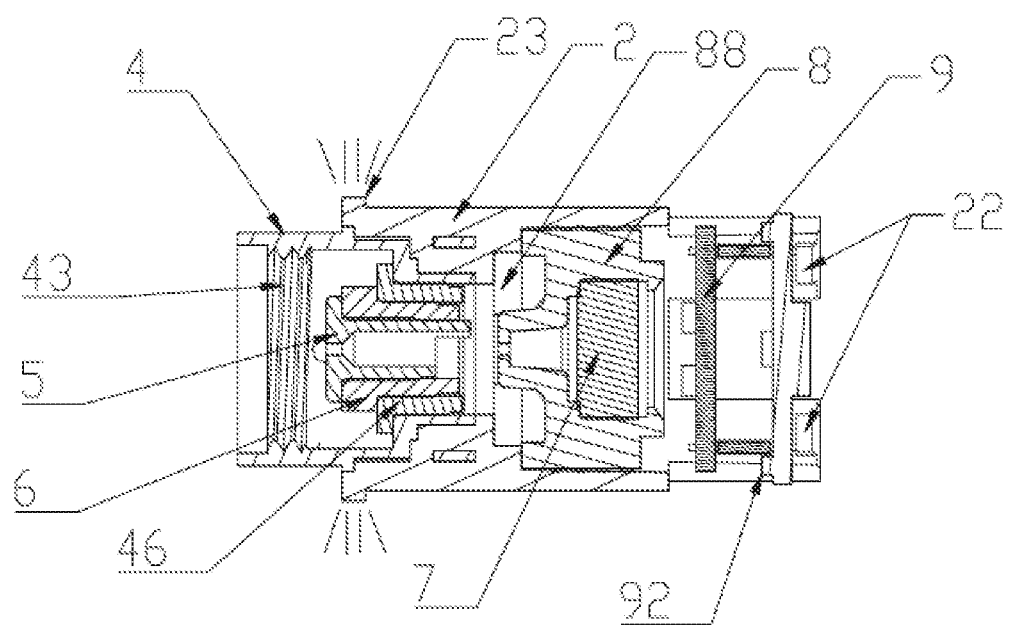
FIG. 13 is a cross-sectional view illustrating a connecting sleeve and internal parts thereof according to the present invention.

Referring to FIGS. 11-13, in the case that the end of the sealing component 8 for the air flow switch which is arranged with the circular truncated cone 86 is mounted inside the connecting sleeve 2, a cavity 88 is formed between the bottom parts of the inner electrode 5 and the insulation sleeve 6, the inner wall of the connecting sleeve 2, and the annular-shaped groove 85. When an electronic cigarette user smokes, the produced vapor may flow back from the vaporization stick to the connecting end 41 of the battery stick, and then flow into the cavity 88 through the through-hole 51 of the inner electrode 5. In such case, the vapor that flows back can be buffered in the cavity 88, and the moisture thereof can be swirled and condensed on the outer wall of the circular truncated cone 86. Hence, the circuits and electronic components and the like arranged on the air flow switch 7, on the circuit board 9 and on the battery 3, can be prevented from corrosion damages caused by the vapor containing moisture which is directly entered into the air flow switch 7, the circuit board 9 and the battery 3 and accumulated for a long time.

Referring to FIGS. 2 and 13, in the battery stick of the electronic cigarette according to the embodiment of the present invention, the connecting sleeve 2 may be made of plastic light-guide materials, and the circuit board 9 is arranged with an LED indicator 92 for emitting light when an electronic cigarette user smokes. The light can be transmitted through the wall of the connecting sleeve 2 to the shoulder 23, thereby lighting up the shoulder 23 as schematically shown in FIG. 13. In the battery stick of the electronic cigarette according to the embodiment of the present invention, since the circuit board 9 is positioned in the middle part of the electronic cigarette, the lamp cap which is usually arranged on the outer tube at the front end of the battery stick can be omitted. In such case, the lamp cap which provides the light-indication function is replaced by the shoulder 23 of the connecting sleeve 2 which is arranged on the side surface of the electronic cigarette. With such arrangement, it is convenient for the users to observe light emitting working states of the electronic cigarette by themselves. Furthermore, the light which escapes through the side surface is attenuated and would not be glaring, which renders soft light with elegant visual feeling and brings better user experience for the users of the electronic cigarette.

As described above, the connecting sleeve 2 may be made of plastic light-guide materials, and the light emitted by the LED indicator 92 exits from the shoulder 23. In such case, the notch 21 of the connecting sleeve 2 has another function of facilitating the arrangement of the LED indicator 92 on the protruding and extending part 91 of the circuit board 9. In such case, the bright light emitted by the LED indicator 92 can be axially directly projected to the radial section of the wall of the connecting sleeve 2 which is formed with the notch 21, so as to allow more lights to be axially transmitted through the wall of the connecting sleeve 2 to the shoulder 23.

Referring to FIG. 2, the battery stick of the electronic cigarette according to the embodiment of the present invention can be connected with a vaporization stick of the electronic cigarette to form the electronic cigarette with working principles as follows. When an electronic cigarette user smokes by his mouth, the negative pressure generated in the mouthpiece and the vaporization stick is transmitted to the battery stick. Due to the suction, outside-air flows in through the air inlet aperture 13, and then through the space between the battery 3 and the inner wall of the outer tube 1, through the notch 21 of the connecting sleeve 2, through the air flow switch 7, through the central aperture 87 of the sealing component 8 for the air flow switch, and through the through-hole 51 of the inner electrode, such that the air flow path 10 for channeling the air flow is formed. The air flow path 10 is illustrated by the arrows in FIG. 2, and the direction of the arrows indicates the air flow direction. When air flows through the air flow switch 7, smoking action of the electronic cigarette user can be detected and an electronic signal can be sent to the circuit board 9 by means of the air flow switch 7. After the identification by means of the circuit board 9, a control signal can be sent so as to switch on the battery power for the vaporization unit or the heating coil inside the vaporization stick, and the electronic cigarette liquid is heated and vaporized to produce vapor by means of the heated heating coil or the heated vaporization unit. Meanwhile, the light emitted by the LED indicator 92 of the circuit board 9 is transmitted to the shoulder 23 through the inner wall of the connecting sleeve 2, such that the light escaped through the shoulder 23 indicates working states of the electronic cigarette.

INDUSTRIAL APPLICABILITY

All the above are merely the preferred embodiments of the present invention, but are not to limit the invention in any form. The present invention is intended to cover all changes, various modifications and equivalent arrangements included within the sprit and scope of the present invention.

The invention claimed is:

1. A battery stick of an electronic cigarette, characterized in that: the battery stick comprises an outer tube having a closed end and an opening end, and a connecting sleeve, wherein a battery is disposed inside the outer tube, an air inlet aperture is provided in a wall of the outer tube, an inner wall of the opening end of the outer tube is sleeved on an outer wall of the connecting sleeve, an inner wall of one end of the connecting sleeve corresponding to the opening end of the outer tube is sleeved on and connected with an outer electrode, an inner wall of the other end of the connecting sleeve is sleeved on and mounted with an air flow switch, a sealing component for the air flow switch and a circuit board, the outer electrode is arranged with connecting means, an inner electrode is arranged inside the outer electrode, and an insulation sleeve is arranged between the inner electrode and the outer electrode to separate them from each other, the sealing component for the air flow switch and the circuit board are successively mounted in the connecting sleeve, the air flow switch is mounted inside the sealing component for the air flow switch, a notch which is rectangular in cross section is formed in a wall of the connecting sleeve at a position where the circuit board is mounted, a protruding and extending part is arranged at a circumferential edge of the circuit board and correspondingly engaged with the notch, and a bulge is arranged on an inner wall of one end of the connecting sleeve which is arranged with the notch, so as to retain the circuit board.

2. The battery stick of the electronic cigarette according to claim 1, characterized in that: a circumferential protruding shoulder is radially arranged on one end of the connecting sleeve which is arranged with the outer electrode, wherein an outer diameter of the shoulder equals to that of the outer tube, or the difference therebetween is less than ±2 mm.

3. The battery stick of the electronic cigarette according to claim 2, characterized in that: the connecting sleeve is made of plastic light-guide materials, the circuit board is arranged with an LED indicator for emitting light when an electronic cigarette user smokes, and the light can be transmitted through a wall of the connecting sleeve to the shoulder and light up the shoulder.

4. The battery stick of the electronic cigarette according to claim 1, characterized in that: the outer electrode comprises a connecting end and a fixed-connecting end, wherein the connecting end is tubular shaped and exposed from the connecting sleeve, the connecting end has a smaller outer diameter than the connecting sleeve, and the connecting means is internal thread provided on an inner wall of the connecting end; wherein the fixed-connecting end is fixedly connected to an inner wall of one end of the connecting sleeve, an inner wall of the fixed-connecting end adjacent to the connecting end is aligned with an inner wall of the connecting end, and inner diameter of another part of the inner wall of the fixed-connecting end sharply decreases, the inner electrode is sheathed with an insulation sleeve and then mounted on the inner wall of the fixed-connecting end at a position where the inner diameter is decreased.

5. The battery stick of the electronic cigarette according to claim 4, characterized in that: an annular groove is formed on an outer wall of the fixed-connecting end of the outer electrode, and an inner protruding shoulder which can be correspondingly engaged with the annular groove is formed on an inner wall of the connecting sleeve, and the fixed-connecting end of the outer electrode is engaged with the connecting sleeve by in-mold integral molding.

6. The battery stick of the electronic cigarette according to claim 1, characterized in that: a metal sleeve is arranged between the outer electrode and the insulation sleeve.

7. The battery stick of the electronic cigarette according to claim 1, characterized in that: circumferential bulges are radially arranged on an outer wall of the sealing component for the air flow switch, the sealing component for the air flow switch is axially arranged with a wiring channel, a receiving cavity for snugly receiving the air flow switch is provided inside one end of the sealing component for the air flow switch, an inner circumferential bulge is radially arranged at an opening of the receiving cavity so as to retain the air flow switch; wherein, at the other end of the sealing component for the air flow switch, a protruding hollow circular truncated cone is formed in the center and an annular-shaped groove is formed in the periphery, and a central aperture is provided in an upper surface of the circular truncated cone, so as to communicate with a hollow part of the circular truncated cone and with the receiving cavity.

8. The battery stick of the electronic cigarette according to claim 1, characterized in that: the sealing component for the air flow switch is made of soft plastic materials, silica gel or rubber materials.

\* \* \* \* \*